US 6,622,388 B2

(12) United States Patent
Meyer et al.

(10) Patent No.: US 6,622,388 B2
(45) Date of Patent: Sep. 23, 2003

(54) METHOD FOR EXTENDING THE MEASURING RANGE OF AN ABSOLUTE ANGLE IN MAGNETIC-FIELD SENSORS

(75) Inventors: Marcus Meyer, Karlsbad (DE); Markus G. Kliffken, Buehl (DE); Holger Thoelke, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/111,746
(22) PCT Filed: Jul. 11, 2001
(86) PCT No.: PCT/DE01/02596
§ 371 (c)(1), (2), (4) Date: Apr. 26, 2002
(87) PCT Pub. No.: WO02/18880
PCT Pub. Date: Mar. 7, 2002

(65) Prior Publication Data
US 2003/0019114 A1 Jan. 30, 2003

(30) Foreign Application Priority Data
Aug. 30, 2000 (DE) .......................... 100 42 602

(51) Int. Cl.⁷ ............................. G01D 5/14; G01D 7/30
(52) U.S. Cl. ...................................... 33/1 PT; 33/708
(58) Field of Search ....................... 33/1 PT, 1 N, 33/706, 708

(56) References Cited

U.S. PATENT DOCUMENTS

| 4,631,540 A | * | 12/1986 | Feldman | 33/1 PT |
| 4,991,301 A | * | 2/1991 | Hore | 33/366.25 |
| 5,446,966 A | * | 9/1995 | Ishizaki | 33/1 PT |
| 5,746,005 A | * | 5/1998 | Steinberg | 33/1 PT |
| 6,212,783 B1 | * | 4/2001 | Ott et al. | 33/1 PT |

FOREIGN PATENT DOCUMENTS

| DE | 31 41 015 A | 6/1982 |
| EP | 1 037 017 A | 9/2000 |
| EP | 1 069 400 A | 1/2001 |

* cited by examiner

Primary Examiner—Christopher W. Fulton
(74) Attorney, Agent, or Firm—Michael J. Striker

(57) ABSTRACT

The invention relates to a method for expanding the absolute angle measurement range in magnetic field sensors. Through the use of an evaluation circuit (12), various method steps are carried out; first, the ratio of two phase-shifted input values is determined, for example sine signals or cosine signals of the voltage (2, 3). The ratio of the phase-shifted input values (2, 3) to each other is combined with an offset C. The predeterminable offset C permits the expansion (9) of the angle measurement range of magnetic field sensors to a full 360° rotation (11) or a multiple thereof.

10 Claims, 2 Drawing Sheets

Figure 1:
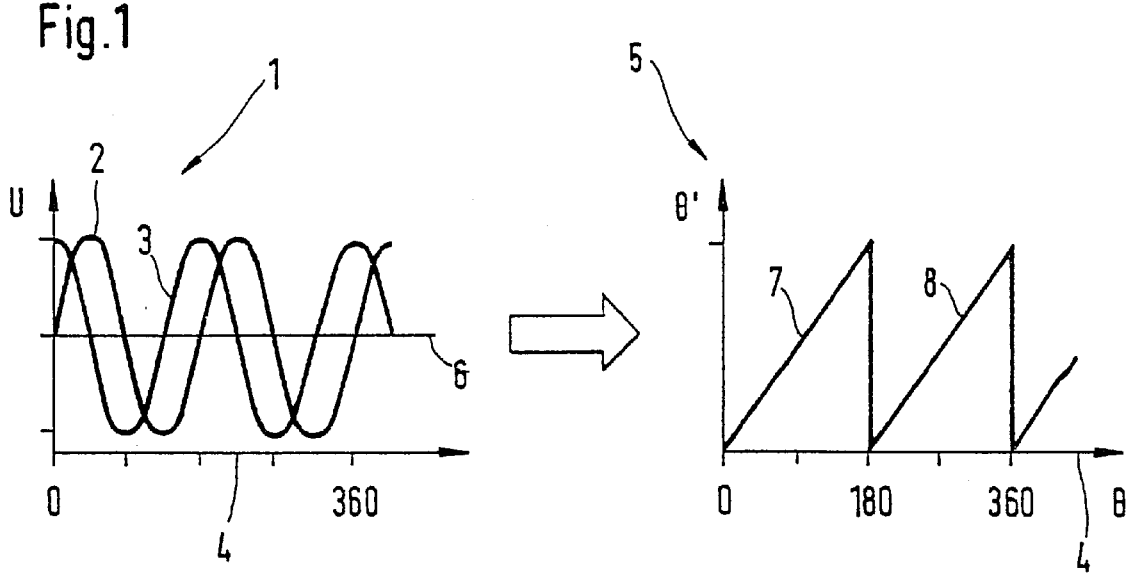

METHOD FOR EXTENDING THE MEASURING RANGE OF AN ABSOLUTE ANGLE IN MAGNETIC-FIELD SENSORS

TECHNICAL FIELD

In modern angle measurement methods, magnetic field sensors are operated in a measuring bridge apparatus. An absolute angle measurement over an angular range of 360° using AMR sensors is possible only at a high cost. With Hall or GMR sensors, it is possible to expand the range to 360°; with AMR sensors, a measurement range of 180° is possible.

PRIOR ART

In modern magnetic field sensors, which contain a bridge circuit (for example, a Wheatstone bridge), a 360° absolute angle measurement can only be achieved with difficulty, if at all. A sensor element supplies a voltage, which behaves in accordance with equation (1):

$$U_\theta = U_0 + \Delta U \cos^2(\theta) \quad (1)$$

In AMR sensors, an absolute angle measurement of up to 180° is consequently possible without additional electrical wiring. Measuring the absolute angle requires two full bridges, which are disposed offset from each other by 45°. One of these full bridges supplies a sine signal; the other full bridge supplies a 90° phase-shifted cosine signal of the voltage curve to be measured.

If the output voltages are set in relation to each other, then the absolute angle of the phase shift can be determined by using the arctan function. The following equation is used for this purpose:

$$\theta' = \frac{1}{2}\arctan\left(\frac{U\sin(\theta)}{U\cos(\theta)}\right) \quad (2)$$

The quadratic relation according to equation (1) permits only a saw-toothed function with a 180° coverage.

A 180°-period angular resolution yields multiply defined values in the event of a full rotation (360 angular degrees). Often, however, functional considerations make a uniquely defined value range necessary or desirable. For example, this can be achieved by means of additional magnetic coils inside or outside the sensor element. Embodiments of this kind, however, require costly sensors and complex evaluation circuits. This additional wiring complexity and the attendant additional costs should be avoided. Moreover, sensors with magnetic coils can only be retrofitted into already existing circuits with difficulty.

DEPICTION OF THE INVENTION

With the embodiment proposed according to the invention, an absolute angle calculation can be carried out, which does not involve increased hardware requirements. In already existing evaluation circuits, which are equipped with an A/D converter, modifications can be carried out in the circuit in order to carry out the method according to the invention, which involve only a low retrofitting cost. Due to the degree of freedom in the design of the scaling factors $A_{sin}$, $A_{cos}$, the evaluation method can be adapted to the other sensors easily and with no trouble. The calculation of the offset values $K_{sin}$ and $K_{cos}$ can take place as part of band end programming, for example during the production of the evaluation system.

The embodiment proposed according to the invention permits the calculation of the offset values $K_{sin}$ and $K_{cos}$ to take place in both the analog part and the digital part of an evaluation circuit.

The method proposed according to the invention permits an extension of the arctan function from 180° to 360° and consequently an expansion of the value range. If the transitions of the 360° flanks are detected, the method according to the invention also permits an incremental measurement or an absolute angle detection of those absolute angles that are greater than 360°. Even in this embodiment of the method according to the invention, additional magnetic coils, which are integrated into sensor elements, can be eliminated. This allows the embodiment variant to also be implemented in evaluation circuits, which have already been delivered or are already in operation, without high retrofitting costs. The method for expanding the absolute angle measurement range proposed according to the invention permits extremely precise absolute angles to be measured within a full rotation of 360°; the method proposed according to the invention also easily permits an increase of the measurement range by a multiple of a 360° rotation.

DRAWINGS

The invention will be explained in detail below in conjunction with the drawings.

Figure 2:
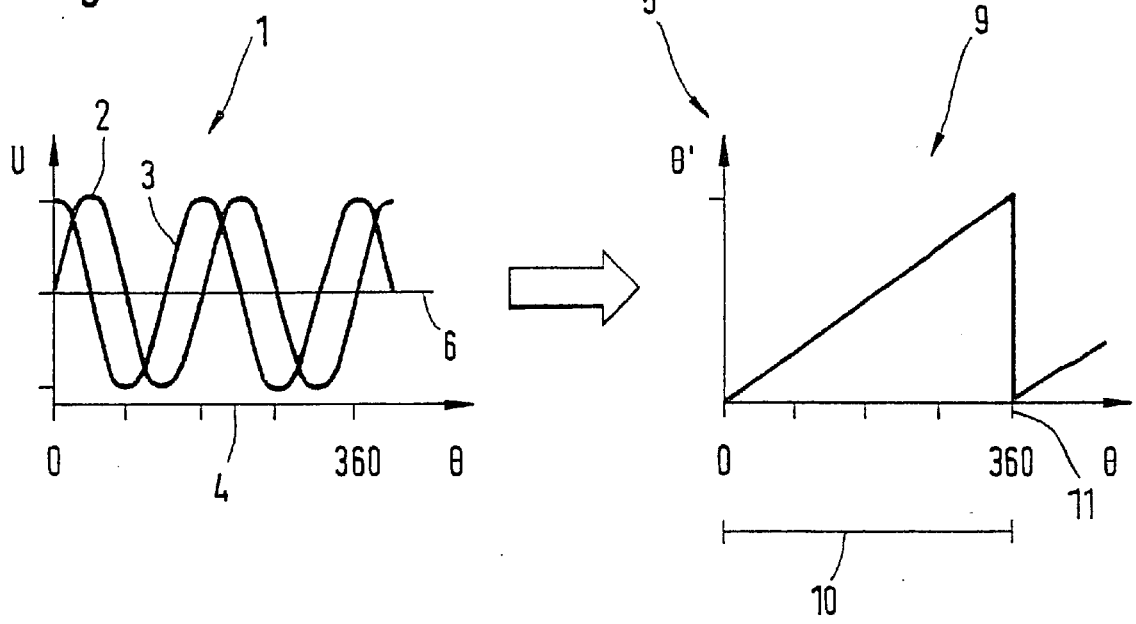
Figure 3:
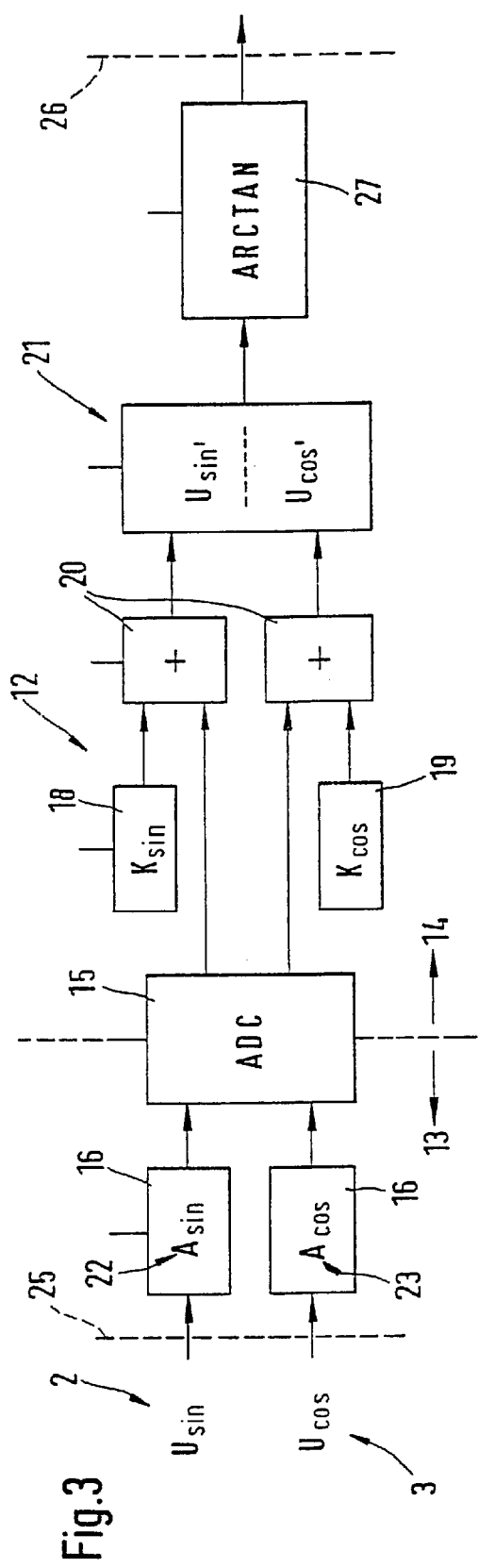
Figure 4:
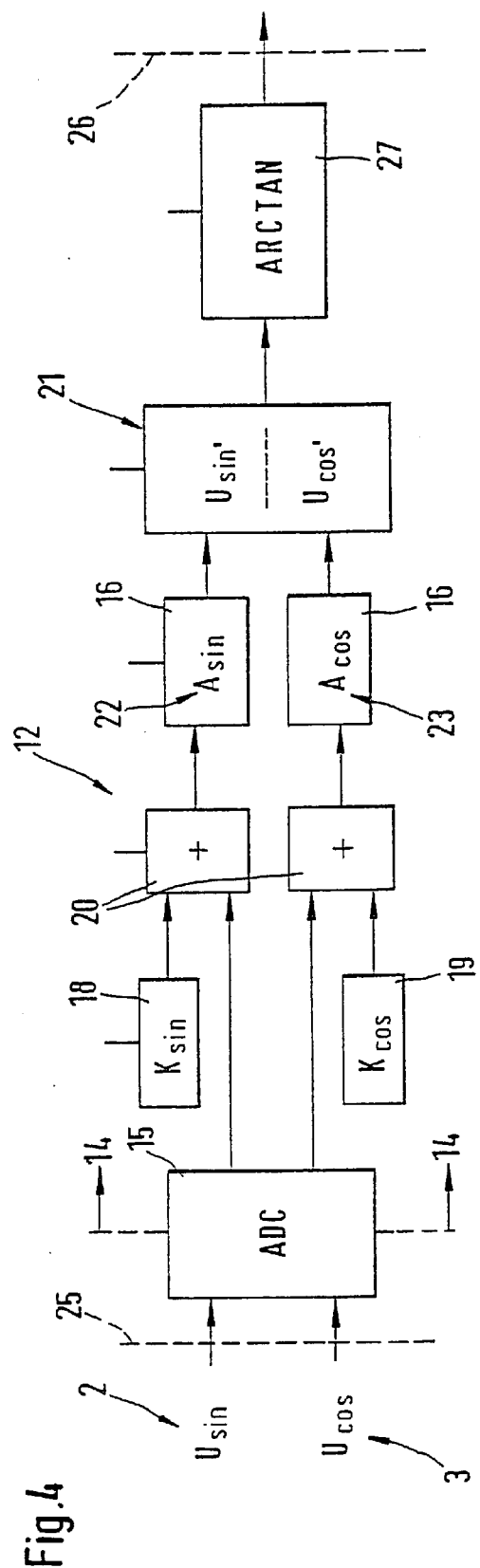

FIG. 1 shows the curve of phase-shifted input signals in the form of the sine and cosine components of an input voltage, which are phase shifted by 90° in relation to each other, and the saw-toothed curve of the absolute angle, divided into two saw tooth segments of 180° each, FIG. 2 shows the voltage curves of the sine and cosine voltage components and their depiction over a full 360° rotation of the absolute angle, FIG. 3 shows an evaluation circuit, in which the scaling of the amplitudes of the input signals is executed in the analog part, and FIG. 4 shows an evaluation circuit according to FIG. 3, with scaling factors and the offset values in the digital part of the evaluation circuit.

EMBODIMENTS

In voltage curves according to FIG. 1, which are labeled with the reference numeral 1, the voltage curve depicted there is produced because of the quadratic relation according to equation 1. The voltage curve is divided into a sine component 2 and a cosine component 3, which are phase-shifted in relation to each other by 90°, as mentioned above. The reference numeral 6 indicates the offset of the bridge circuit from $U_{bridge} = U_{supply}/2$ If the sine component 2 and the cosine component 3 of the voltage are set in relation to each other, then the arctan function can be used to determine the absolute angle according to equation 2 given above. The saw-toothed function according to FIG. 1 is characterized by a first 180° saw tooth specifically labeled with the reference numeral 7 and by a second 180° saw tooth specifically labeled with the reference numeral 8. The saw teeth in this embodiment known from the prior art extend only over a measurement range from 0 to 180° or from 180° to 360°. In a further processing of absolute angle signals thus obtained, multiply defined associations per saw tooth 7 or 8 occur for various absolute angles θ'. The double definition of the absolute angle data 7 and 8, considered over a full 360° rotation, is often undesirable. Therefore, it is desirable to provide a simple embodiment for a uniquely defined angle measurement in order to produce uniquely defined values.

The method proposed according to the invention for expanding the detection of the absolute angle range includes a magnetic field sensor, AMR/GMR sensors, or also Hall elements, and an evaluation circuit 12, for example a controller. The output voltages 2 and 3 are digitized in an A/D converter 15 and then supplied to the arctan algorithm 27. This supplies the absolute angle data for other evaluation purposes in a further signal processing. The expanded absolute angle measurement is based on the determination of the angle based on the ratio of input values, for example the sine component 2 and cosine component 3 of the voltage.

Hence:

$$\tan\theta = \frac{A\sin\theta}{B\cos\theta} = \frac{x}{y} \quad (3)$$

If an offset C is added to the denominator in equation (3), then y is modified to y'. The offset C is taken into consideration in the following either as an increase or a decrease. When the equation $$y' = B\cos\theta + C \quad (4)$$

is inserted into equation (3), this yields the equation:

$$\tan\theta' = \frac{x}{y'} = \frac{A\sin\theta}{B\cos\theta + C} \quad (5)$$

If the sensor is equilibrated, then A=B. This prerequisite yields:

$$\tan\theta' = \frac{\sin\theta}{\cos\theta + \frac{C}{A}} \quad (6)$$

$0 \leq C \leq A$.

The special case of C=A=B=1 results in the special case of the trigonometric function of the half angle.

$$\tan\frac{\theta}{2} = \frac{\sin\theta}{\cos\theta + 1} \quad (7)$$

This yields:

$$\tan\theta' = \tan\frac{\theta}{2} = \frac{\sin\theta}{\cos\theta + \frac{C}{A}} \quad (8)$$

This relation now describes two extended saw tooth curves of the absolute angle, which can be influenced in their period width by means of the offset C. If the offset C is less than the constants A and B according to equations 5 and 8, then the result is two saw toothed curves within 360°, as are shown, for example, in connection with the absolute angle curve in FIG. 1. The two saw toothed curves, labeled with the reference numerals 7 and 8, can have different period widths (for example P1=180°+α and P2=180°−α for 0<α<180°). It would be possible to evaluate these with the method according to the invention, but would require a significantly more complex evaluation circuit compared to the evaluation circuits 12 shown in the subsequent FIGS. 3 and 4.

FIG. 3 shows an evaluation circuit 12 that can be operated with the method according to the invention, which includes an analog part 13 and a digital part 14.

The sine component 2 and the cosine component 3 of the voltage are present at the input side 25 of the evaluation circuit 12. First, they are subjected to an amplitude scaling 16. In the configuration according to FIG. 3, the amplitude scaling includes the determination of scaling factors 22, 23 before the signal conversion from analog signals into digital signals in the A/D converter.

After the conversion of the analog signals into digital signals, the output signals of the analog/digital converter 15 are sent to summation components 20. The output signals of the sine and cosine offset functions 18 and 19 are present at the inputs of the summation functions 20 in the digital part 14 of the evaluation circuit 12. The digitally processed voltage components for sine 2 and cosine 3 now have the respective sine offset 18 and cosine offset 19 added to them before the signals, which are obtained after the summation in the summation components 20, are set in relation to each other in a function block. The function blocks can, for example, be realized in the form of software code in a microcontroller or can also be embodied in the form of discretely embodied individual components. The voltage ratio 21 $U_{sin}'/U_{cos}'$ is introduced as an input signal into the trigonometric function 27. At the output of the component that determines the trigonometric function, there is a stable output signal, which is suitable for further processing.

The depiction according to FIG. 4 shows the evaluation circuit according to FIG. 3, but with the difference that the scaling of the amplitudes and the determination of the offsets for the sine and cosine components take place entirely in the digital part 14 of the evaluation circuit 12.

The sine components 2 and cosine components 3 of the input values—in this case of the voltage signal—are present at the input side 25 of the evaluation circuit 12 according to FIG. 4. They are sent directly to the A/D converter, which, analogous to the configuration according to FIG. 3, connects them to summation functions 20 with the sine offsets and cosine offsets, which are determined in separate functions 18 and 19. In a further processing of the signals as part of an amplitude scaling 16, the output signal of the summation components 20 is scaled by means of scaling factors $A_{sine}$ 22 and $A_{cosine}$ 23 before a voltage ratio of $U_{sine}'/U_{cosine}'$ is formed from the output signals of the amplitude scaling 16, analogous to the depiction according to FIG. 3. The output signal, i.e. the ratio of the modified voltages, is sent to a trigonometric function component 27 in which, in preferred embodiments of the method according to the invention, the arctan function is implemented.

The factor C, which is used to compensate for the phase difference between the input signals, is determined from the minimal and maximal measurement values of the input signals 2, 3:

$$C = K_{\cos} = \frac{U_{\max\cos} - U_{\min\cos}}{2} \quad (9)$$

According to the method in question (see depiction in FIG. 3 and FIG. 4), a stable signal is obtained at the output side 26 of the evaluation circuit 12; if the condition is fulfilled that $K_{cos}=C$ and $K_{sin}=0$, then these values are added to the voltage value so that in the subsequent trigonometric function component 27, an angle is evaluated, which is corrected by the phase difference C and is mathematically converted into the actually prevailing absolute angle.

With the method proposed according to the invention, if the flanks of the 360° transitions according to the extended saw tooth arrangements 9 in FIG. 3 are registered, then through their summation, there can be a determination of angles that are greater than 360°. The method proposed according to the invention is thus also suited for angle measurement systems with an arbitrarily large measurement range, where the only things that must be provided are a saw tooth flank registration and a reference mark.

As can be seen from the depictions according to FIGS. 3 and 4, the evaluation circuit 12 can be embodied in various ways. For example, the scaling by means of the scaling factors $A_{sine}$ 22 and $A_{cosine}$ 23 can be executed both in the analog part 13 of the evaluation circuit 12 and in the digital part 14 of the evaluation circuit 12 according to FIG. 4.

This offers the advantage that with the method for expanding the absolute angle measurement range proposed according to the invention, no increased requirements are placed on the hardware components. It is therefore possible to eliminate expensive 360° AMR sensor systems, which have coils integrated into the sensory mechanism and are therefore costly as components; furthermore, the proposed system can be favorably adapted to already configured sensor systems or to sensor systems that are already in use. The adaptations require only the reestablishment of the scaling factors 22 and 23 as well as the offset values for the sine component 18 and cosine component 19. The determination of these new factors can, for example, occur during the production or adaptation of the evaluation system as part of a band end programming.

REFERENCE NUMERAL LIST 1 voltage curves
2 sine signal
3 cosine signal
4 magnetic angle
5 absolute angle (determined)
6 average voltage
7 first 180° saw tooth
8 second 180° saw tooth
9 angular span
10 360° depiction
11
12 evaluation circuit
13 analog part
14 digital part
15 A/D converter
16 amplitude scaling
17 correction value determination
18 sine offset
19 cosine offset
20 addition function
21 voltage ratio
22 scaling factor $A_{sine}$
23 scaling factor $A_{cosine}$
24 trigonometric function
25 input side
26 output side

What is claimed is:

1. A method for expanding the absolute angle measurement range in magnetic field sensors through the use of an evaluation circuit (12) with the following method steps:
    the production of the ratio of two phase-shifted input values (2, 3),
    the ratio of the phase-shifted input values (2, 3) is combined with an offset C,
    the predeterminable offset C permits the expansion (9) of the measurement range from sensors to a full rotation (11) or a multiple thereof.

2. The method according to claim 1, characterized in that the evaluation circuit (12) includes an analog part (13) and a digital part (14).

3. The method according to claim 2, characterized in that the amplitude scaling (16) of the phase-shifted input values (2, 3) can take place both in the analog part (13) and in the digital part (14) of the evaluation circuit.

4. The method according to claim 2, characterized in that the scaling factors (22, 23) $A_{sin}$, $A_{cos}$ are determined either in the analog part (13) or in the digital part (14) of the evaluation circuit (12).

5. The method according to claim 1, characterized in that offset values (18, 19) for the respective sine or cosine signal (2, 3) of the input values are determined from the maximal and minimal values of the phase-shifted input values (2, 3).

6. The method according to claim 5, characterized in that the offset C is determined from the input values (2, 3).

7. The method according to claim 6, characterized in that both the offset $K_{sin}$ (22) and the offset $K_{cos}$ (23) can be determined from the maximal and minimal values of the input values (2, 3).

8. The method according to claim 7, characterized in that the offset values $K_{sin}$ (22) and the offset $K_{cos}$ (23) obtained are added into the output voltage values (2) or (3) before the determination of the absolute angle.

9. The method according to claim 8, characterized in that a stable output signal is obtained at the output side (26) of the evaluation circuit (12) if the offset $K_{cos}$ (19) corresponds to the offset C and $K_{sin}$ (18) is equal to 0.

10. The method according to claim 8, characterized in that a stable output signal is obtained at the output side (26) of the evaluation circuit (12) if the offset $K_{sin}$ corresponds to the offset C and the offset $K_{cos}$ (19)=0.

* * * * *